July 26, 1949.  L. M. SPRINKLE ET AL  2,477,529
PORTABLE GRILL
Filed May 31, 1945  2 Sheets-Sheet 1
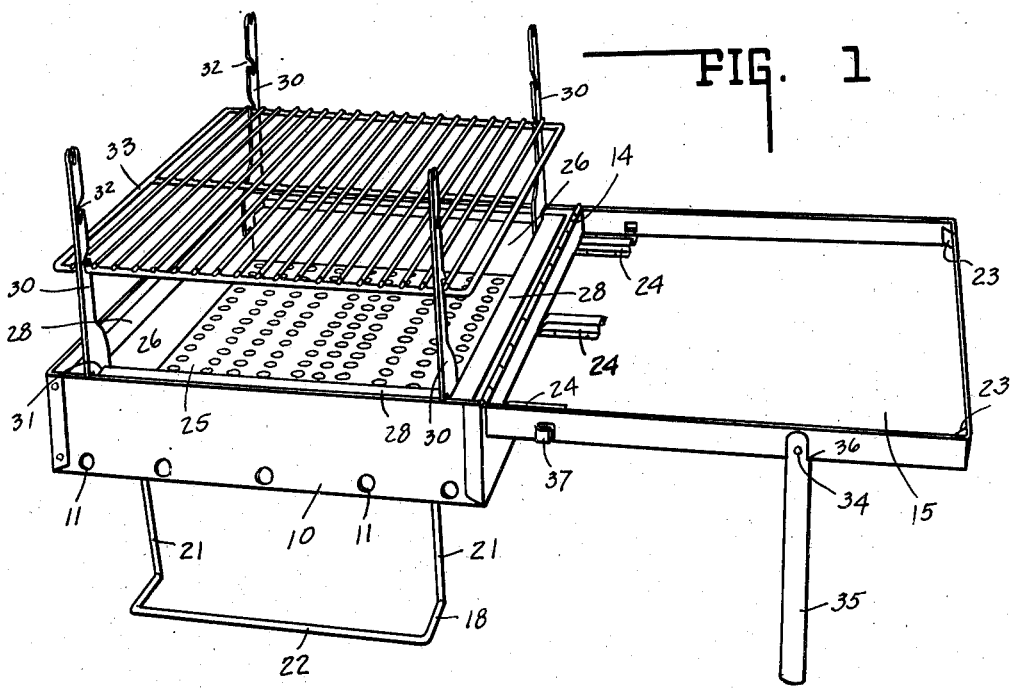
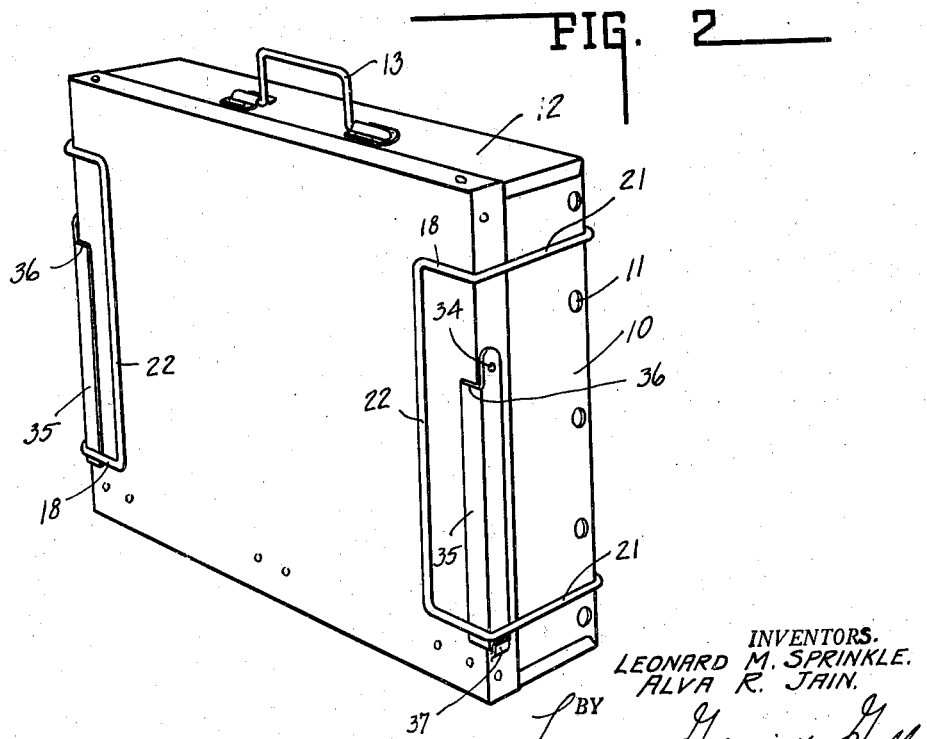
INVENTORS.
LEONARD M. SPRINKLE.
ALVA R. JAIN.
BY Lockwood, Goldsmith & Galt.
ATTORNEYS.

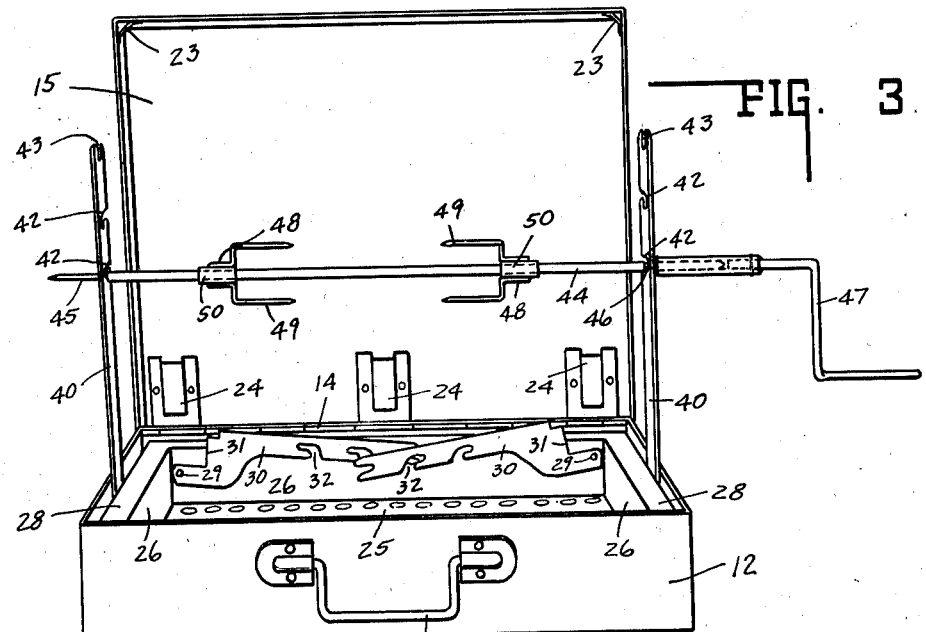
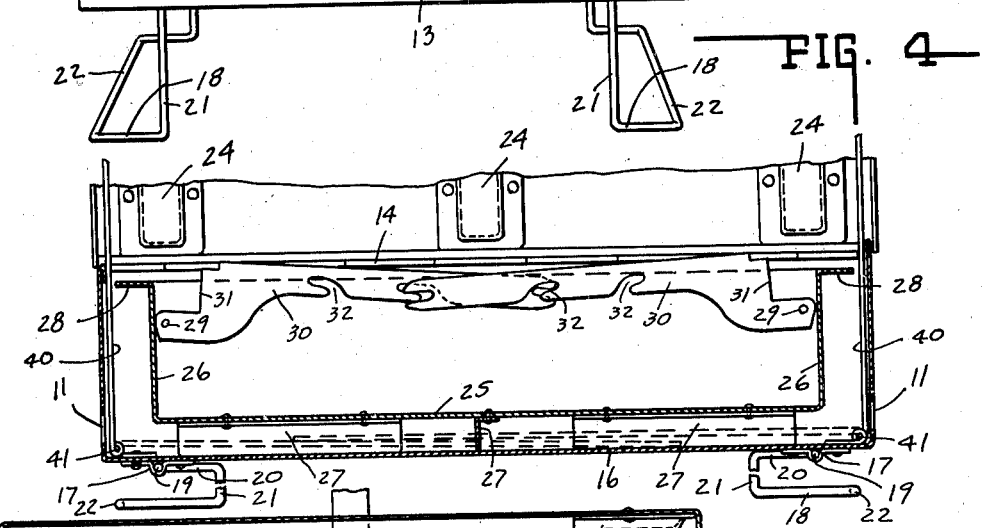
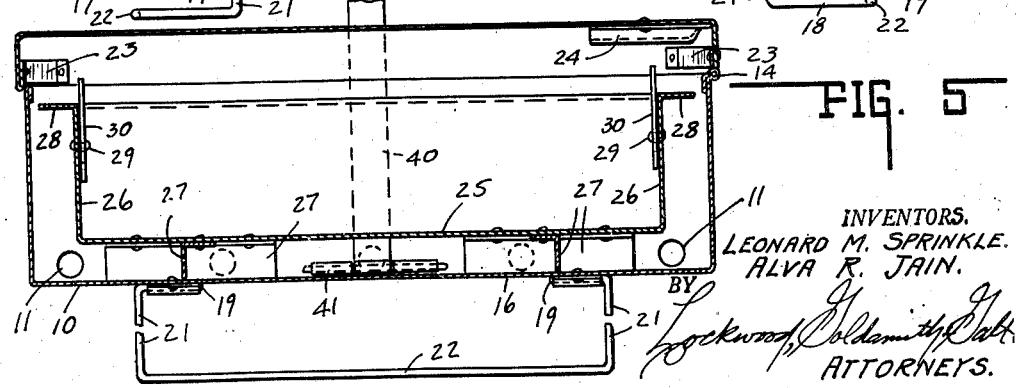

Patented July 26, 1949

2,477,529

UNITED STATES PATENT OFFICE 2,477,529

PORTABLE GRILL

Leonard M. Sprinkle, Galveston, and Alva R. Jain, Greentown, Ind., assignors to Meco, Inc., Galveston, Ind., a corporation of Indiana Application May 31, 1945, Serial No. 596,840

1 Claim. (Cl. 126—9)

This invention relates to a portable grill.

The chief object of this invention is to provide a grill structure suitable for grilling, broiling, barbecuing and the like and which is readily collapsible into carrying case arrangement and which is readily erected into operative position.

The chief feature of the present invention resides in utilizing a two-part case provided with legs that readily collapse to hold the case together.

Another chief feature of the invention resides in the air cooled firebox arrangement.

A further chief feature of the invention resides in the instrumentalities utilized for broiling, grilling and barbecuing and the mounting of the same.

Other objects and features of the invention will be set forth more fully hereinafter.

The full nature of the invention will be understood from the accompanying drawings and the following description and claim.

In the drawings,

Fig. 1 is a front elevation of the portable grill in grilling position, and looking slightly into the same.

Fig. 2 is a perspective view of the portable grill in closed position.

Fig. 3 is a side elevation of the portable grill in barbecuing position and looking slightly into the same.

Fig. 4 is a vertical sectional view of the device in barbecuing position, the upper portion being omitted, the legs being broken away and dotted lines indicating the collapsed position of the spit supports.

Fig. 5 is a vertical sectional view taken at right angles to the section taken for Fig. 4 and shows the cover closed.

In Fig. 2 the invention is shown collapsed and includes a main casing or bottom 10 provided at two ends with apertures 11. On an intermediate side 12 is mounted a collapsible handle 13, which when folded down upon said side does not project beyond the bottom edge thereof.

Hinged to the opposite side and at the diagonally opposite edge as at 14, see Fig. 1, is the cover 15 of shallow tray type. Hinged to the bottom portion 16 of the main casing 10, as at 17, see Figs. 4 and 5, are the legs 18. These each comprise a pair of aligned but spaced ends 19 forming pivots from which project parallel portions 20 of predetermined length. From each of same project transverse leg elements 21, same being joined together by the U-shaped foot portion 22.

When the lid or tray is closed, see Fig. 2, the legs can be folded from extended position so that the U-shaped foot structure laps and friction latches the lid in place. The length of leg elements 21 is approximately equal to the depth of the grill when collapsed and the length of portions 20 is that between the pivotal axis 17 and the adjacent side wall 10.

The cover, see Fig. 3, may be used as a windbreak, or, see Fig. 1, as a working table. The cover corners may be reenforced as at 23 and also may be provided with interior patch pockets 24 for utensil reception.

The firebox consists of a perforated base 25 and sidewalls 26. The latter are of less area than that of the adjacent casing wall and the former is of less area than that of the casing bottom 16. Feet 27 space the bottom 25 from bottom 16. Each sidewall 26 has an outwardly directed flange 28 terminating immediately adjacent the adjacent casing sidewall. The result is a firebox that is air insulated, except for heat conduction from feet 27, from the casing. The latter by reason of the leg structure is spaced from the supporting surface. Hence, the grill may be table mounted or positioned on the ground without danger of burning the table or leaves, etc., on the ground. Since the preferred fuel is charcoal, coke or coal bricket, there will be no spark hazard. Also, due to the air circulating arrangement, the exterior is always cool and fire can always be easily kindled and even with a newspaper to start.

Pivoted near each corner as at 29 and appreciably below the flange 28 on two opposite side walls 26 is arm 30 that lies substantially parallel to the wall. Each arm is notched as at 31 and a portion thereof engages the sidewall when erected and the other portion bears on flange 28, see Fig. 1.

Each arm 30 has therein a superposed series of downwardly directed notches 32. When the arms are erected, see Fig. 1, a grill or grating 33 may be associated therewith, seating in the corresponding notches 32 as shown. Hence, the grillage can be adjusted in elevation relative to the bed of fire in the fire box for various types of grilling and broiling.

The cover tray 15 has pivoted externally as at 34 an angle section leg 35 cut away as at 36 to form a cover sustaining ledge. The cover includes angle shaped tongue 37 struck from the cover sidewall. When the leg 35 is collapsed to the cover, it is seated in the groove formed by the cover and the tongue and as shown in Fig. 2 is retained collapsed by the leg structure 18 overlying same.

Whenever the grill is to be used for barbecuing, etc., two uprights 40 are erected. These are hinged as at 41 to bottom 16 and for broiling purposes normally lie collapsed against the bottom and below the firebox. When erected, the firebox flanges 28 serve to prevent inward collapse of these uprights.

Each may have a similar series of notches 42 as well as an end notch 43. A polygonal spit 44 has a reduced and pointed end 45 and a reduced circular portion 46. These portions are notch seated. The detachable handle 47 is provided to rotate the spit.

Slidable thereon, but rotatable therewith, are a pair or several pairs of hooks or meat penetrating members 48, each having prongs 49 and a complementary polygonal sleeve 50.

When the arms 30 and uprights 40 are collapsed, the spit, handle and hooks may be placed in the firebox for retention and the grill closed as shown in Fig. 2.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

In a grill a box-like base, a fire box detachably nested therein and spaced therefrom, spit supporting means permanently and interiorly hinged near the bottom of the base at two opposite sides and intermediate the ends thereof and each of a length less than the length of an intermediate side for collapse within the base and adjacent the bottom thereof when the fire box is de-nested, the base and fire box adjacent the upper ends thereof providing a space therebetween, and flange means substantially closing such space, said spit supporting means when erected being interposed between the flange means and the base supporting the same.

LEONARD M. SPRINKLE.
ALVA R. JAIN.

REFERENCES CITED

The following references are of record in the file of this patent:

UNITED STATES PATENTS

| Number | Name | Date |
|---|---|---|
| 1,128,485 | Moor | Feb. 16, 1915 |
| 1,540,073 | Hugo | June 2, 1925 |
| 1,540,434 | Stone | June 2, 1925 |
| 1,563,895 | Coleman | Dec. 1, 1925 |
| 1,883,946 | Kingsbaker | Oct. 25, 1932 |
| 2,058,172 | Myers | Oct. 20, 1936 |
| 2,094,915 | Dawson | Oct. 5, 1937 |
| 2,102,217 | Polhemus | Dec. 14, 1937 |
| 2,334,847 | Spiers | Nov. 23, 1943 |

FOREIGN PATENTS

| Number | Country | Date |
|---|---|---|
| 113,707 | Germany | Oct. 2, 1915 |